Sept. 1, 1959 W. ULLMANN 2,902,584
METHOD OF DETACHING MATERIAL BY ELECTRIC EROSION
Filed Dec. 27, 1956 4 Sheets-Sheet 1

INVENTOR.
WERNER ULLMANN
BY

INVENTOR.
WERNER ULLMANN

Sept. 1, 1959 W. ULLMANN 2,902,584
METHOD OF DETACHING MATERIAL BY ELECTRIC EROSION
Filed Dec. 27, 1956 4 Sheets-Sheet 3

INVENTOR.
WERNER ULLMANN
BY

Sept. 1, 1959 W. ULLMANN 2,902,584
METHOD OF DETACHING MATERIAL BY ELECTRIC EROSION
Filed Dec. 27, 1956 4 Sheets-Sheet 4
Fig. 18
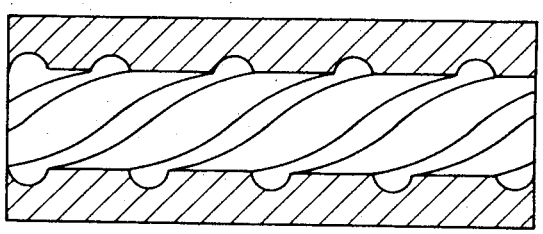
Fig. 19
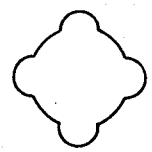
Fig. 20
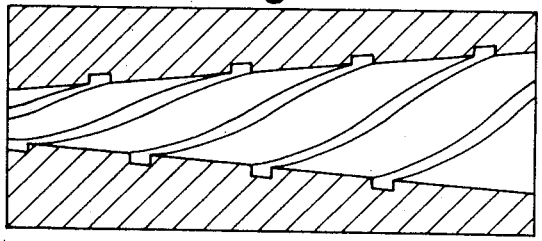
Fig. 21
Fig. 22
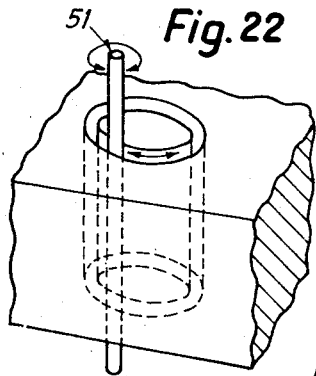
Fig. 23
Fig. 24
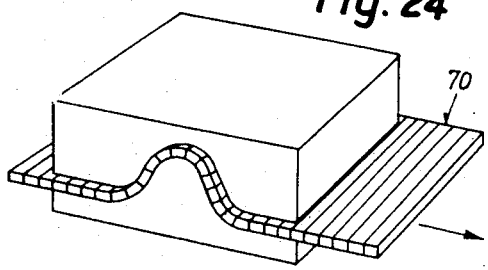
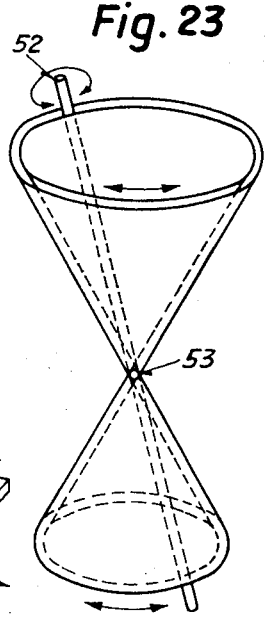
INVENTOR.
WERNER ULLMANN
BY

United States Patent Office 2,902,584
Patented Sept. 1, 1959

---

2,902,584

METHOD OF DETACHING MATERIAL BY ELECTRIC EROSION

Werner Ullmann, Locarno, Switzerland, assignor to AGIE, A.G. für industrielle Elektronik, Locarno, Switzerland, a Swiss company Application December 27, 1956, Serial No. 630,954

Claims priority, application Switzerland December 30, 1955

12 Claims. (Cl. 219—69)

The present invention relates to a method of detaching material by means of electric erosion and to the application of the said method.

The known methods of detaching material by means of electric erosion enable only prismatic bores to be obtained. While the electrodes can be designed in any shape, the bores possess identical cross-section throughout their length. On the other hand, dies may be produced with the known methods where the electrode has a shape complementary to that of the recess to be produced. It has so far been impossible to produce workpieces with cross-sections deviating vertically from the direction of feed.

The present method enables workpieces or bores in workpieces to be made in which at least sections of at least one of the boundary walls deviate from a straight line. The present invention relates to a method of detaching material of solid bodies by means of electric erosion using non-rotating or very slowly rotating tool electrodes which can perform a feed movement relative to the metal body to be machined. The invention is characterized by the fact that the electrodes are displaced, at least part of the time during their feed movement and at least with their electrode heads, from the straight feed direction by at least one movement in a direction other than that of feed.

Embodiments of the method according to this invention are shown in the attached drawing, in which:

Fig. 18 shows the production of interior grooves in cylindrical tubes or bores;

Fig. 19 is a cross-section of the associated electrode;

Fig. 20 shows an example similar to that of Fig. 18 with a conical tube;

Fig. 21 is a cross-section of the associated electrode;

Fig. 22 shows the production of a cylindrical recess with a bar electrode;

Fig. 23 shows an example similar to that of Fig. 22 with a conical recess, and

Fig. 24 shows the production of a recess of any design by means of a Venetian-blind-type electrode.

The examples cited can best be explained by means of spark erosion but the method can generally be applied in all processes where material is detached by means of electric energy. Attention is particularly called to detaching material with accelerated charged particles such as ions or electrons. Naturally the electrode ends and the active portions of the electrode respectively are of a design different from those shown in the figures but the principle of the method can be applied to these other processes of electric erosion as well.

Figure 1:
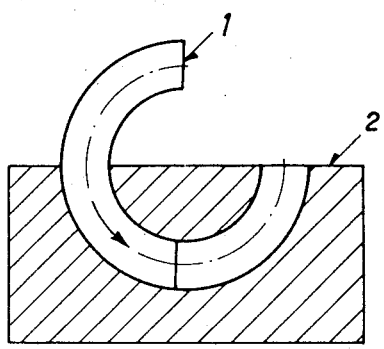
Fig. 1 shows the production of a recess circular in profile.

Fig. 1 shows how a bore of semicircular cross-section is produced. By way of example, the electrode 1 is of circular cross-section and moves circularly into the workpiece 2 in the direction of the arrow. If a direct or alternating voltage is applied between the workpiece and the electrode, material is detached in the known manner at the working spot between workpiece and electrode, feed being effected by hand or automatically at a rate determined by the electrical factors and the composition of the material. In the example according to Fig. 1, the electrode is moved circularly, production of a fillet being possible by combining a movement normal to the axis of rotation.

Figure 2:
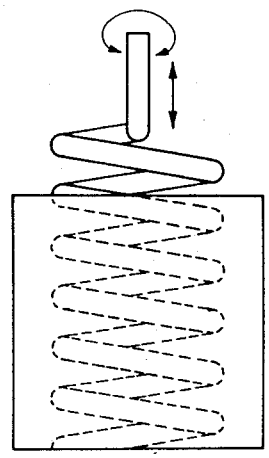
Fig. 2 shows the production of a helical bore.

Fig. 2 shows how helical bores can be obtained which are necessary, in particular for cooling solid blocks, such as engine blocks. The electrode is designed to form the complement of the opening to be obtained, and e.g. shaped as a cork-screw. While material is being detached, the electrode performs rotation about its central straight axis which is combined with the axial movement towards the workpiece. The two combined movements are independent of one another according to the type of opening to be produced and to the form of the complementary electrode respectively. The electrode can be given any cross-section provided that it is identical along its entire length so that its movement in the bore is not obstructed.

Openings can be obtained in which the two directions of movement of the electrode are independent of one another. An example is shown Fig. 3 and the associated electrode in Fig. 4. On the one hand, the electrode is moved into the workpiece at a constant rate and in addition performs small movements in the direction normal to the feed axis in order to produce the desired shape of the opening, which is wavelike in Fig. 3. The spherical electrode 4 is guided by a straight holder 5, the electrode head being required to be of a larger diameter in the direction of movement than the straight holder.

Figure 3:
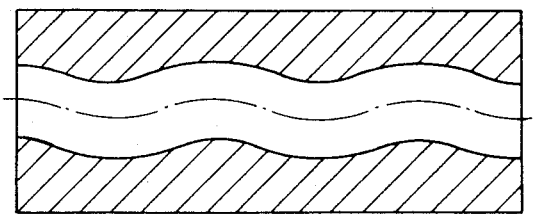
Fig. 3 shows the production of a wavelike bore.
Figure 4:
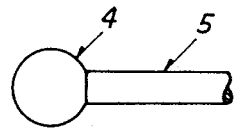
Fig. 4 shows an electrode for Fig. 3.

In Figs. 3 and 4 the illustration may be assumed to form a section of a longitudinally extended bore which may be obtained as by a third combined movement of the electrode normal to the drawing plane so that Fig. 3 shows the profile of a prismatic opening.

Figure 5:
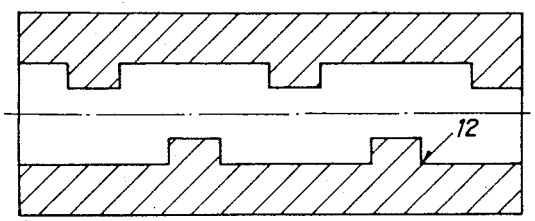
Fig. 5 shows the production of a bore in intermittent combination of a feed movement with a rotary movement.
Figure 6:
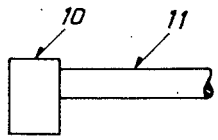
Fig. 6 shows the associated electrode.

The electrodes are not required to perform continuous movements; an example is shown in Fig. 5 while Fig. 6 represents the associated electrode. The electrode head 10 may be designed as a cylinder and its holder 11 arranged eccentrically. The electrode is fed into the workpiece as far as corner 12, the holder 11 then rotated by 180° and a further feed movement performed. The movement of the electrode is accordingly performed in subsequent stages and in different directions.

Figure 7:
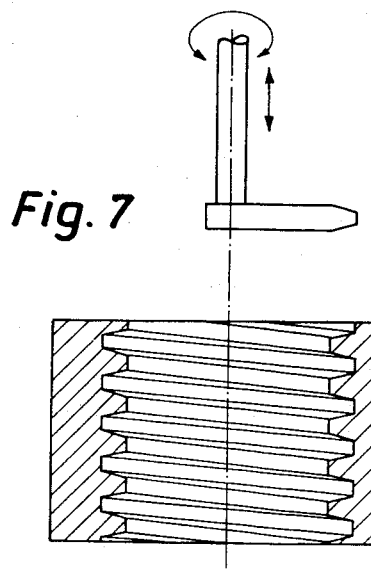
Fig. 7 shows the production of a thread by means of the electrode.

In the example shown in Fig. 7, a thread is cut into a workpiece, the electrode end performing a helical movement. Axial movement is combined with a rotation, the ratio between the said two movements determining the pitch of the thread. The resulting feed rate, as usual, is determined by the composition of the material of the workpiece and the electrode, and by amperage, voltage, etc.

Figure 8:
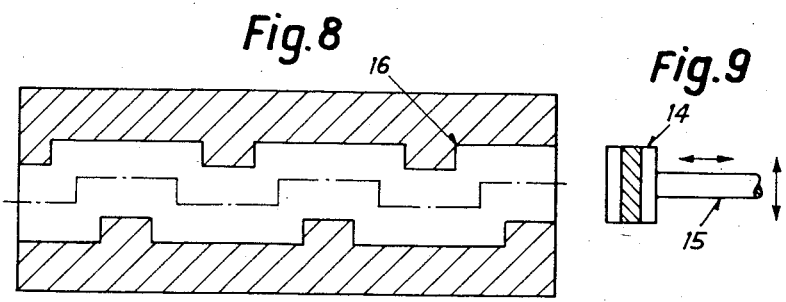
Fig. 8 shows the production of a bore in intermittent combination of a feed movement and a movement normal thereto.
Figure 9:
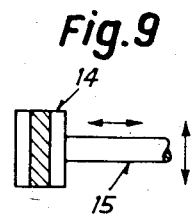
Fig. 9 shows the associated electrode.

A similar application of the method is shown in Fig. 8, and the electrode for performing the method in Fig. 9. According to the shape of the opening desired, the electrode head 14 may be round, square or have any other cross-section, while its holder 15 is preferably symmetrically arranged on the head. When the left-hand top corner of the electrode head has reached the corner 16, the electrode performs a movement normal to its feed direction, subsequently again a movement in the first direction etc., thus defining a meander path. The dot-dash "symmetry line" shows the movement of the centre of the electrode head.

Figure 10:
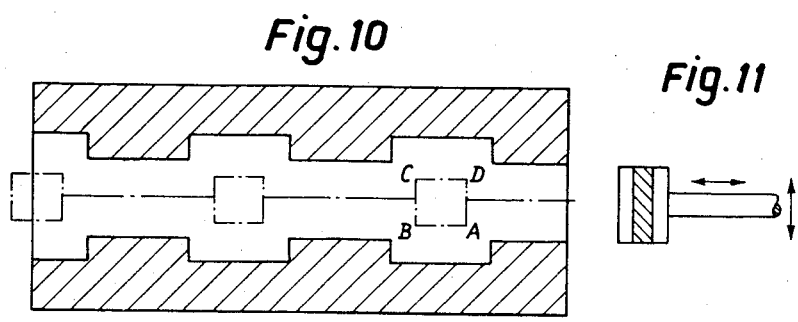
Fig. 10 shows an example similar to that of Fig. 8.
Figure 11:
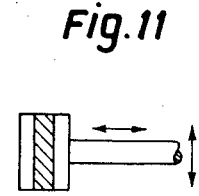
Fig. 11 shows the associated electrode.

A further number of openings can be obtained by means of the same electrode if the electrode head performs not only movements along a curve but describes areas. Fig. 10 shows an example. The electrode (Fig. 11) is again introduced to where the desired recess is to be produced, its centre then describing the rectangle ABCD thus producing an enlarged space of corresponding shape in the bore. The intermittent movement of the electrode in the examples cited should, however, be regarded as a simplification of the principle designed to permit of more precise description; a far greater number of bores can be obtained by simultaneous combination of the feed movement and movements in the two directions normal to the direction of feed, and rotations of the electrode about its axis.

Figure 12A:
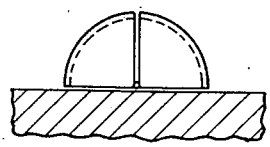
Figs. 12a, 12b and 12c show the production of a round fillet.
Figure 12B:
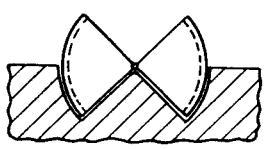
Figure 12C:
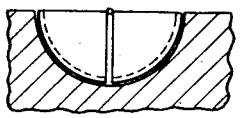
Figure 13A:
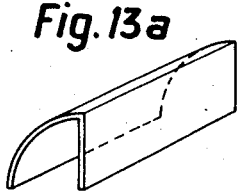
Figs. 13a and 13b show the associated electrode.
Figure 14:
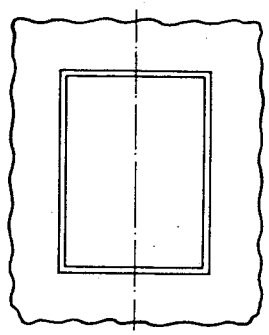
Fig. 14 is a plan view of the fillet of Fig. 12c.
Figure 15:
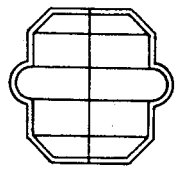
Fig. 15 is an example similar to that of Fig. 12c in plan view.
Figure 13B:
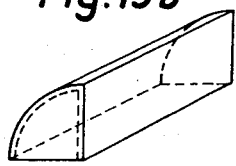

A further group of types of the material detachment according to this invention is shown in Figs. 12a, 12b, and 12c and Figs. 14 and 15, the electrode cross-sections being as shown in Figs. 13a and 13b. Two electrodes, each having the cross-section of a quadrant are movable about a common axis. At the beginning of the process (Fig. 12a), the two half electrodes are applied to the workpiece in the shape of a semicircle. During the process (Fig. 12b), the two quadrant electrodes move into the workpiece while rotating about their common point of contact. Fig. 12c shows the finished process, two electrode sides have abutted in the workpiece. Where the sides of the electrodes are open, a semicircular groove is cut into the workpiece, and where the electrodes are provided with lateral closures (Fig. 13b), an opening in the shape of a circular semicylinder is cut into the workpiece (Fig. 14). In this manner a multitude of recesses may be produced, such as the one shown in Fig. 15 which is particularly suitable to house bearings such as antifriction bearings. As can be clearly seen from the foregoing, it is possible to produce a workpiece practically in one operation without detaching all the material to be removed by means of a cutting tool, which has not been possible with the applications of the methods so far known.

Figure 16A:
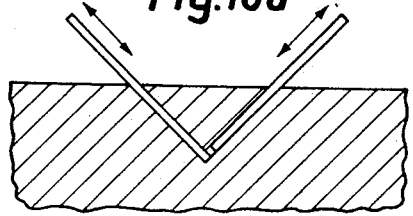
Figs. 16a and 16b show the production of a triangular fillet in elevation and plan view, respectively.
Figure 16B:
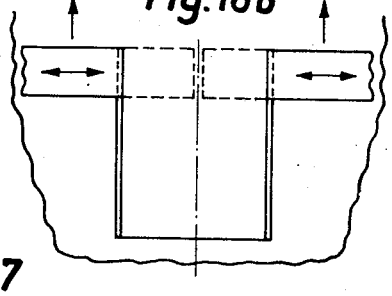

To manufacture an angular fillet, the most efficient procedure is as shown in Figs. 16a and 16b. Two cutters connected to one voltage pole perform the movements indicated by the arrows and simultaneously a movement normal to the drawing plane (Fig. 16b). In this manner fillets of any length may be obtained. The angle of the fillet is determined by the angle which the two cutters enclose.

Figure 17:
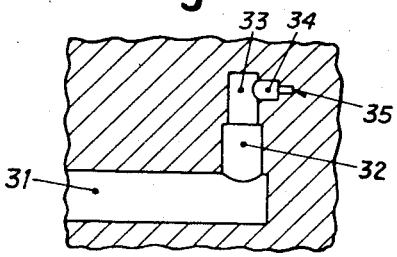
Fig. 17 shows a bore obtained with a telescopic electrode.

The combined movements need not, however, be performed relative to the workpiece; they may also be performed relative to other portions of the electrode in which case the electrode is formed of several portions movable relative to one another, e.g. in telescopic arrangement. A bore obtained with such an electrode is shown in Fig. 17. After introducing the first electrode 31 into the workpiece as far as required, section 32 is forced out of the first section of the electrode, then section 33 from section 32 etc. In other words, the active portion of the electrode transmitting sparks in this instance is displaced in the feed direction and normal to this direction in stages. Such a telescopic electrode can be employed more universally if the movement is not intermittent but continuous and simultaneous in the various directions.

Fig. 18 shows a bore such as used in the barrels of firearms. Longitudinal grooves are found in the interior wall of the bore which give the projectile its rotation. In the present application, an electrode having a complementary shape is rotated into the workpiece at a rate determined by the desired pitch. The section of the electrode is shown in Fig. 19. It is also possible to design the electrode as a profiled disc only and in this case the pitch may be determined by alteration of the feed rate. A barrel of this type increases the rate of rotation of a projectile during its passage.

Figs. 22 and 23 show an example in which the combined movement may be performed at the same time or subsequently without affecting the shape of the opening. The pin-type or rod-type electrode 51 is moved through the workpiece and performs a movement parallel with its own axis and circumscribed about the piece to be removed. In this process it has been found advantageous to cause the electrode to roll on the desired cutting surface, i.e. to rotate it as indicated by the arrow at the end of the electrode. Instead of rotating, the electrode may be caused to perform small oscillations about its position in the longitudinal direction similar to a stud saw or jig saw.

Where the workpiece is of greater thickness, it is recommended to combine the movement around the piece to be removed and the movement into the workpiece in such a manner that the active electrode end performs a spiral-type movement, by way of example for a cylindrical recess; this will prevent eroded material from adhering to the operating slit so that cleaning is improved, complete de-ionization ensured and wear of the electrodes is more uniform.

This type of operation is not, however, limited to axially parallel movements of the electrode, as shown in Fig. 23. A conical piece is here cut from a workpiece. The ends of a rod electrode 52 perform a circular movement in such a manner that one point 53 of the electrode remains stationary. To obtain clean surfaces, the electrode can again be caused to roll. Where workpieces are of greater thickness, the electrode can again be introduced into the workpiece simultaneously with the circular movement of one electrode end.

In the last two examples, the electrode may be designed as a band which is guided past the cutting point in the manner of a band saw. Of course, the rotation of the electrode around its axis can here be dispensed with.

A last example is shown in Fig. 24 in which a Venetian-blind-type electrode is moved in serpentine fashion through a workpiece. In this application of the method, the movement in the feed direction is combined with a movement normal thereto. The electrode may be guided by laterally projecting pins or by exterior magnetic means where the laterally guiding slots are undesirable. The entire electrode, or at least the core of the electrode must be formed of ferromagnetic material while the workpiece must possess different magnetic properties in this case.

The electrode may in all cases be moved by hand or automatically. For the control of automatic operation, mechanical, electrical, electronic, electromagnetic, hydraulic, pneumatic or other methods may be employed. Control may be so that the feed rate is predetermined or the control may operate the feed so that it is determined by the rate of erosion, i.e. by the volume of the material eroded.

However, the feed may be determined, in spark erosion, by the distance between electrode and workpiece so that an "ideal spark gap" for erosion is provided at all times, or control may depend on the voltage or frequency conditions in the generator. In practice, a combination of the control devices mentioned will prove advantageous.

It should further be mentioned that all movements between the workpiece and the electrode must be regarded as relative movements; it is possible that the electrode may remain stationary and the workpiece be moved in some applications; the movement in one direction may be performed by the electrode and the movement in one of the other directions by the workpiece.

Having now particularly described and ascertained the nature of my said invention and in what manner the same is to be performed, I declare that what I claim is:

1. A method of detaching material from a solid body by means of electric erosion employing a tool electrode; comprising the steps of performing a straight feed movement of said tool electrode relative to said solid body and deviating at least the active portions of said tool electrode during said feed movement from said straight feed direction by at least one combined movement in a direction other than said straight feed movement relative to said solid body, said active portion of said tool electrode being first displaced linearly toward said body, then rotated about a point eccentric to the center of said active portion of said electrode tool by a predetermined angle, subsequently further displacing said portion of said tool linearly, and then again rotating the same about the same center by a predetermined second angle, and repeating said steps a predetermined number of times.

2. A method of detaching material from a solid body by means of electric erosion employing a tool electrode; comprising the steps of performing a straight feed movement of said tool electrode relative to said solid body and deviating at least the active portions of said tool electrode during said feed movement from said straight feed direction by at least one combined movement in a direction other than said straight feed movement relative to said solid body, said active electrode portion being moved along a meander path defined by a first feed movement and a second feed movement normal to said first feed movement.

3. A method according to claim 2, said first and second movements of said active electrode portion occurring simultaneously.

4. A method of detaching material from a solid body by means of electric erosion employing a tool electrode; comprising the steps of performing a straight feed movement of said tool electrode relative to said solid body and deviating at least the active portions of said tool electrode during said feed movement from said straight feed direction by at least one combined movement in a direction other than said straight feed movement relative to said solid body, said active portion of said electrode being successively displaced first linearly and then transversely in at least one direction normal to the direction of said feed movement and returned, subsequently again displaced linearly and again displaced transversely in the same manner, and repeating the displacing movements linearly and transversely in steps a predetermined number of times.

5. A method according to claim 4, the two linear and transverse movements of said active electrode portion being performed simultaneously.

6. A method of detaching material from a solid body by means of electric erosion employing a tool electrode; comprising the steps of performing a straight feed movement of said tool electrode relative to said solid body and deviating at least the active portions of said tool electrode during said feed movement from said straight feed direction by at least one combined movement in a direction other than said straight feed movement relative to said solid body, said active portion of said tool electrode being moved along a portion of a plane curved line.

7. A method of detaching material from a solid body by means of electric erosion employing a tool electrode; comprising the steps of performing a straight feed movement of said tool electrode relative to said solid body and deviating at least the active portions of said tool electrode during said feed movement from said straight feed direction by at least one combined movement in a direction other than said straight feed movement relative to said solid body, said active portion of said tool electrode being displaced along a plane wavelike line.

8. A method of detaching material from a solid body by means of electric erosion employing a tool electrode; comprising the steps of performing a straight feed movement of said tool electrode relative to said solid body and deviating at least the active portions of said tool electrode during said feed movement from said straight feed direction by at least one combined movement in a direction other than said straight feed movement relative to said solid body, said active portion of said tool electrode being displaced along a three-dimensional wavelike line.

9. A method of detaching material from a solid body by means of electric erosion employing a tool electrode; comprising the steps of performing a straight feed movement of said tool electrode relative to said solid body and deviating at least the active portions of said tool electrode during said feed movement from said straight feed direction by at least one combined movement in a direction other than said straight feed movement relative to said solid body, at least one electrode being reciprocated linearly in an axial direction and then displaced normally to said direction.

10. A method of detaching material from a solid body by means of electric erosion employing a tool electrode; comprising the steps of performing a straight feed movement of said tool electrode relative to said solid body and deviating at least the active portions of said tool electrode during said feed movement from said straight feed direction by at least one combined movement in a direction other than said straight feed movement relative to said solid body, said tool electrode comprising a rod-type electrode and being displaced in a direction parallel to the axis of said rod-type electrode and circumscribing a portion of said solid body to be removed, said rod-type electrode being oscillated along the surface of said body being eroded in the manner of a jig saw.

11. A method of detaching material from a solid body by means of electric erosion employing a tool electrode; comprising the steps of performing a straight feed movement of said tool electrode relative to said solid body and deviating at least the active portions of said tool electrode during said feed movement from said straight feed direction by at least one combined movement in a direction other than said straight feed movement relative to said solid body, said tool electrode comprising a rod-type electrode and being first moved to a predetermined position axially along a predetermined axis and then swivelled about a path describing a conical shell, the apex of which lies on said axis.

12. A method of detaching material from a solid body by means of electric erosion employing a tool electrode; comprising the steps of performing a straight feed movement of said tool electrode relative to said solid body and deviating at least the active portions of said tool electrode during said feed movement from said straight feed direction by at least one combined movement in a direction other than said straight feed movement relative to said solid body, said tool electrode comprising a rod-type electrode and being oscillated and moved along a cutting surface in the manner of a jig saw, and being first moved axially into a predetermined position along a predetermined axis and then swivelled about a path describing a conical shell, the apex of which is located on the axis.

References Cited in the file of this patent

UNITED STATES PATENTS

| | | |
|---|---|---|
| 1,492,167 | Granger | Apr. 29, 1924 |
| 2,059,236 | Holslag | Nov. 3, 1936 |
| 2,476,965 | Emerson et al. | July 26, 1944 |
| 2,773,968 | Mortellotti et al. | Dec. 11, 1956 |

FOREIGN PATENTS

| | | |
|---|---|---|
| 624,062 | Germany | Jan. 11, 1936 |